(12) United States Patent
Coulier et al.

(10) Patent No.: US 10,447,477 B2
(45) Date of Patent: Oct. 15, 2019

(54) METHOD FOR ON-BOARD PRIME NUMBER GENERATION

(71) Applicant: GEMALTO SA, Meudon (FR)

(72) Inventors: Charles Coulier, Gemenos (FR); Karine Villegas, Gemenos (FR); Nabil Hamzi, Gemenos (FR); Ali Zeamari, Gemenos (FR); Nicolas Roussel, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 99 days.

(21) Appl. No.: 15/534,079

(22) PCT Filed: Nov. 25, 2015

(86) PCT No.: PCT/EP2015/077682
§ 371 (c)(1),
(2) Date: Jun. 8, 2017

(87) PCT Pub. No.: WO2016/096357
PCT Pub. Date: Jun. 23, 2016

(65) Prior Publication Data
US 2017/0346632 A1 Nov. 30, 2017

(30) Foreign Application Priority Data
Dec. 18, 2014 (EP) ..................................... 14307078

(51) Int. Cl.
*H04L 9/30* (2006.01)
*G06F 7/72* (2006.01)
(Continued)

(52) U.S. Cl.
CPC .............. *H04L 9/3033* (2013.01); *G06F 7/64* (2013.01); *G06F 7/72* (2013.01); *G09C 1/00* (2013.01);
(Continued)

(58) Field of Classification Search
CPC ..................................................... H04L 9/3033
(Continued)

(56) References Cited

U.S. PATENT DOCUMENTS

| 2002/0172356 A1* | 11/2002 | Ono | G06F 7/723 |
| | | | 380/28 |
| 2009/0185681 A1* | 7/2009 | Van Rijnswou | G06F 7/72 |
| | | | 380/44 |
| 2014/0358980 A1* | 12/2014 | Feix | G06F 7/72 |
| | | | 708/446 |

OTHER PUBLICATIONS

International Search Report (PCT/ISA/210) dated Feb. 9, 2016, by the European Patent Office as the International Searching Authority for International Application No. PCT/EP2015/077682.
(Continued)

*Primary Examiner* — Dant B Shaifer Harriman
(74) *Attorney, Agent, or Firm* — Buchanan Ingersoll & Rooney PC

(57) ABSTRACT

The present invention relates to a method to generate prime numbers on board a portable device, said method comprising the steps of, each time at least one prime number is requested:
- when available, retrieve results from previously performed derivation calculation or, if not, select a start point for derivation;
- process derivation calculation to converge towards a prime number;
- if a prime number is found, store it and restart derivation calculation from a new start point;
- stop the derivation calculation after a predetermined amount of time;
- store intermediate results to be used a next time a prime number will be requested;
- output a stored prime number.

6 Claims, 2 Drawing Sheets

(51) Int. Cl.
  *G06F 7/64* (2006.01)
  *G09C 1/00* (2006.01)
  *H04L 9/08* (2006.01)
  *G06F 7/58* (2006.01)

(52) U.S. Cl.
  CPC ............ *H04L 9/0869* (2013.01); *G06F 7/588* (2013.01); *G06F 2207/7204* (2013.01)

(58) Field of Classification Search
  USPC .......................................................... 380/46
  See application file for complete search history.

(56) References Cited

OTHER PUBLICATIONS

Written Opinion (PCT/ISA/237) dated Feb. 9, 2016, by the European Patent Office as the International Searching Authority for International Application No. PCT/EP2015/077682.

Feyt et al., "Off-line/On-line Generation of RSA Keys with Smart Cards", 2nd International Workshop for Asian Public Key Infrastructures, 2002, pp. 153-158.

Clavier et al., "Generating Provable Primes Efficiently on Embedded Devices", Public Key Cryptography, 2012, pp. 372-389.

Joyce et al., "Efficient Generation of Prime Numbers", Cryptographic Hardware and Embedded Systems, 2nd International Workshop, 2000, pp. 340-354.

\* cited by examiner

METHOD FOR ON-BOARD PRIME NUMBER GENERATION

FIELD OF THE INVENTION

The present invention relates to a method to generate prime number on board a portable device. More specifically the invention addresses PKI key on board generation.

The invention also pertains to a device implementing said method.

BACKGROUND OF THE INVENTION

Generally, in classical PKI architectures, devices like smart cards, tokens, USB keys or any other portable device, are advantageously able to internally generate RSA key pairs (public/private key). Such key pairs are used for the creation or verification of digital signatures.

Using independent portable devices is advantageous on a security point of view as such support provides a hardware protection. Private key used for the signature generation remains stored in the device's memory without any exposure to hackers.

RSA On Board Key Generation (OBKG) is thus a successful functionality in such architectures. Many dedicated APIs are proposed, for example by Javacard, to provide this functionality for applications implemented inside or outside the device.

However, this functionality faces a major drawback: calculation duration to generate a key pair is time consuming, sometimes several tens of seconds, and indeterminist.

RSA Key pair generation is primarily based on a pair of prime numbers generation, classically referenced as p and q. Their product constitutes the modulus which is associated to both key public and private. The prime number generation is the more time consuming step during key pair generation. Other steps are performed in a shortest and deterministic time.

Prime number generation is an iterative calculation from an initial random number and converging through successive derivations towards a prime number. Each iteration ends in a primality test and the loop stops when test is positive. Initial number being random, the number of iterations to perform varies in a non predictable way.

FIG. 1 schematically shows an iterative process as used in the prior art to generate a prime number.

In a first step S1, a random number is generated by a random number generator RNG. This random number constitutes a start point $p_s$. This start point is then used in a derivation step S2. This derivation step S2, outputs candidate $p_c$ which is submitted to a primary test PT in a step S3.

If the primality test PT is negative (case N), the candidate $p_c$ is input to the derivation step S2 which will give another candidate. Iteratively, the process thus converges towards a prime number. This part of the process is probabilistic.

It is necessary to derive two prime numbers to generate a pair of keys. It is thus necessary to perform the iterative derivation process twice in order to obtain a pair of prime numbers. The process shown on FIG. 1 is thus repeated two times. Then a key generation based on the two prime numbers is performed. The duration of this last process is of constant duration.

However to generate a key pair, the calculation time can vary in large proportions. If the iterative loop quickly converges, the key pair can be in short time generated. Contrarily, if the generation of at least one of the two prime numbers requires a high number of iterations, the key pair generation can exceed admissible durations.

Thus, algorithms generally give an average run duration deduced from a large number of generations and depending from the device characteristics. However no maximal time can be guaranteed and large durations could be observed. Such duration can become too large for some requesting applications authorizing a limited processing time to the card.

Above this time limit, generation is considered as defective. The failure proportion is a function of the statistical distribution of the calculation time.

Alternative implementations enable to reduce the width of the distribution. A solution called On the Fly PK (Off-line/On-line Generation of RSA Keys with Smart Cards by N.Feyt, M Joye, D. Naccache, and P. Pallier, published in S.-P. Shieh, Ed., 2nd International Workshop for Asian Public Key infrastructures, pp. 153-158, Taipei, Taiwan, Oct. 30-Nov. 1, 2002) proposed to store on the card a predefined number of seeds enabling a very short and deterministic calculation of corresponding prime numbers requested for key generation.

This solution is however difficult to implement due, among others, to the constraints during the card production. Another major drawback is the limited generation number as this number directly depends on the number of stored seeds.

Another possibility to control the generation duration is interruptible OBKG interruptible which consists to interrupt calculations when a critical time is reached and to store the current intermediary context. The requesting application is asked through a specific return code to later pursue the calculation. Such a solution implies constraints that are potentially not admissible for the application.

Further alternative and advantageous solutions would, accordingly, be desirable in the art.

SUMMARY OF THE INVENTION

The present invention proposes to guarantee duration of a prime number generation around a predetermined amount of time, thus avoiding scattering of such durations.

The present invention is defined, in its broadest sense, as a method to generate prime numbers on board a portable device, said method comprising the steps of, each time at least one prime number is requested:

when available, retrieve results from previously performed derivation calculation or, if not, select a start point for derivation;

process derivation calculation to converge towards a prime number;

if a prime number is found, store it and restart derivation calculation from a new start point;

stop the derivation calculation after a predetermined amount of time;

store intermediate results to be used a next time a prime number will be requested;

output a stored prime number.

The invention enables to use systematically a predetermined amount of time dedicated for the prime number generation for this generation, also when a prime number is found. While using this "hidden" time, the invention enables to generate prime numbers in advance and thus to store a maximum number of prime numbers, this number being only limited by the memory resource of the card.

The invention proposes to further store intermediary results. These intermediary results are candidates in derivation process. Such candidates are processed in priority when a next request of prime number is received, for example in case of a key pair generation need. Indeed on a probabilistic point of view, these candidates will require shorter calculation time as a purely random start point.

Contrarily the invention enables, if none prime number has been found in the predetermined time limit, to use previously stored prime numbers. Depending on the requesting application, exceed of the predetermined time limit can be punctually accepted if no more prime number is available.

According to an advantageous feature, the method includes a preliminary step of storing a predefined number of pre-calculated prime numbers, said pre-calculated prime numbers being intended to be output in case no other calculated prime number is available.

This feature consists in storing prime numbers before the card is distributed. It has here to be understood that, instead of exact prime numbers, seeds of prime numbers can also be stored, such seeds requesting very few calculation to converge to the prime number. This feature provides a reserve that can be used in case none other prime number is available.

In a preferred embodiment, the predefined number of pre-calculated prime numbers is determined depending on the device calculation resource and generation duration constraints from application requesting the generation.

This embodiment takes into account the limitation in the device and the requirements from the applications necessitating the prime numbers. Production constraints in the device can limit the capacity for "on the fly" generation. Meanwhile, it can be tolerated to have a given percentage of key generation exceeding a critical time. It gives room for determining the number of pre-stored prime numbers. A compromise can be found taking into account such constraints and requirements.

According to an advantageous feature, the method is further implemented during non critical phases of functioning of the device even in absence of any request for any prime number.

This feature enables to use any hidden time of the functioning of the card to do derivation calculation. Candidates are thus produces while not harming the card normal performance.

According to an advantageous application, the prime numbers are intended to be used for the generation of cryptographic material.

This application of the invention enables to render the generation of cryptographic material of constant duration, also in devices having limited resources.

In an advantageous embodiment, cryptographic material being an RSA key pair and the generation of two prime numbers being requested, the predetermined amount of time is determined based on a double prime number generation.

Such an embodiment applies the invention to RSA key pair generation which is advantageously used in largely spread devices having limited resources in terms of memory or processing.

The present invention also relates to a device intended to produce cryptographic material based on prime numbers, said device implementing a method of the invention and comprising, for this purpose, derivation calculation module to perform derivation calculation to converge towards at least one prime number, a timer, a memory to store prime numbers, a monitoring module to monitor the derivation calculation and to stop such calculation after a predetermined amount of time.

While implementing the invention, such a device is able to be operative in field during a large period as it is able to maintain its internal provision of prime numbers.

Practically speaking, the device advantageously belongs to the group constituted by smart cards, HSM used in production lines, tokens, USB keys, embedded secure elements.

Such devices are the kind of device presenting limited resource in term of memory and calculation. They are typically the kind of devices to which the invention is dedicated.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in details certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OP THE INVENTION

Figure 1:
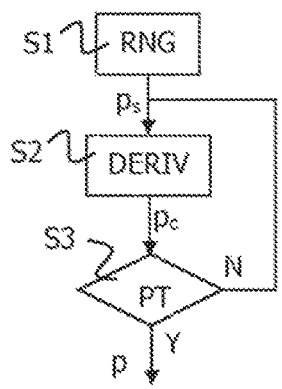
FIG. 1 schematically shows the iterative process to obtain a prime number according to the prior art.

For a more complete understanding of the invention, the invention will now be described in details with reference to the accompanying drawing. The detailed description will illustrate and describe what is considered as a preferred embodiment of the invention as claimed hereinafter. It should of course be understood that various modifications and changes in form or details could readily be made without departing from the spirit of the invention.

For clarity, only those elements and steps which are useful to the understanding of the present invention have been shown in the drawings and will be described.

Figure 2:
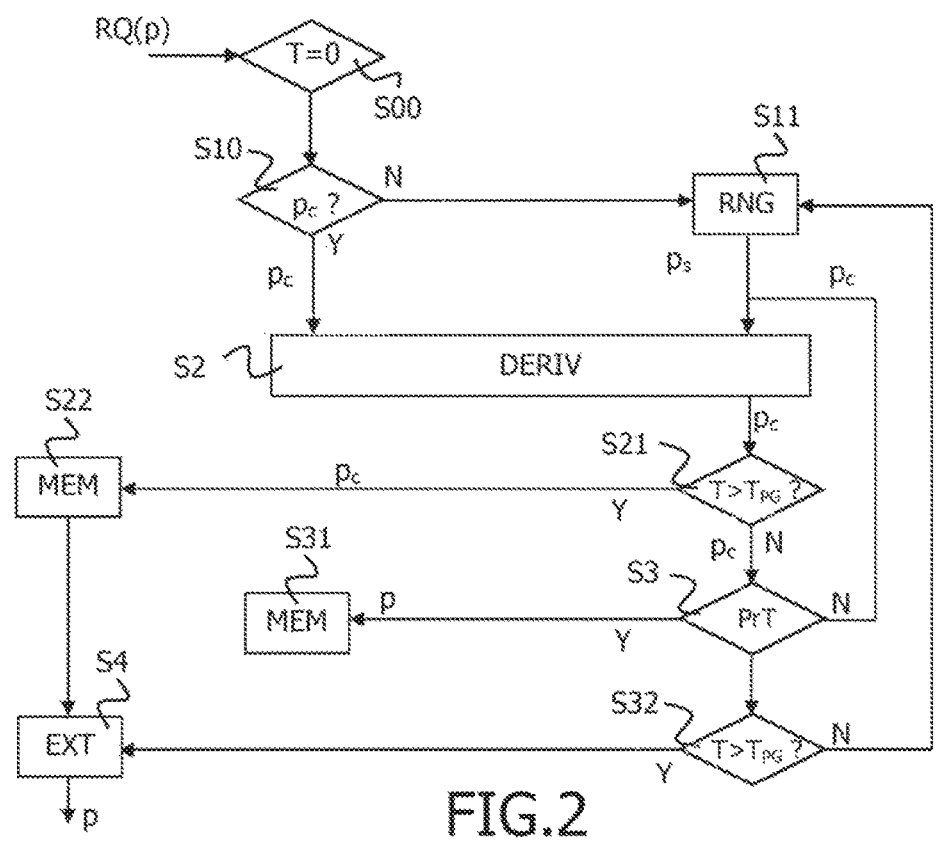
FIG. 2 schematically shows a flowchart of prime number generation according to the invention.

FIG. 2 shows a prime number generation process according to the invention. As soon as a request for at least one prime number is received, a timer T is triggered in a step S00 in order to track the duration of the prime number generation.

Then in a step S10, it is verified if a candidate $p_c$ is available in memory from previous calculation. Typically at the first use of the device implementing the method, none is available. It is here noted that candidate $p_c$ is intermediary result from derivation.

In the case where no intermediary result is available in memory (case N), in a step S11, a random number $p_s$ is generated by a random number generator RNG. This random number $p_s$ is a start point for derivation calculation in a step S2.

In the case intermediary result is available in memory (case Y), the candidate $p_c$ is output from memory towards derivation calculation in step S2. While derivation calculations are processed, according to the invention, the duration is tracked. If the timer T reaches a predetermined amount of time $T_{PG}$ as schematically shown by step S21 on FIG. 2 (case Y), the intermediate result, here at least a candidate $p_c$, is stored in a step S22 in memory to be later retrieved for pursuing iterative derivation process. Intermediate results are candidates under derivation and elements linked to the derivation algorithm used. Typically in case of generation of FIPs keys, candidates are two small prime numbers but any other intermediate data (unit . . . ) depending on the algorithm are here stored.

As long as the timer has not reached the predetermined amount of time $T_{PG}$, the candidate $p_c$ is submitted to a primality test PrT in a step S3. If the candidate is a prime number p (case Y), it is stored in memory in a step S31. Meanwhile the timer T is still monitored as schematically shown by step S32. If the time limit $T_{PG}$ not yet reached (case N), the method is looped and a new random number $p_s$ is then generated in a new step S11. As soon as the time limit $T_{PG}$ has been reached in step S21 or step S32, in a step S4, a prime number is extracted from memory to be used by the requesting application.

The illustrative figure refers to a case where one prime number is requested. The invention also applies of course to cases whatever is the number of primes to generate. It thus clearly applies to cases where precisely two prime numbers have to be generated for RSA key generation.

Figure 3:
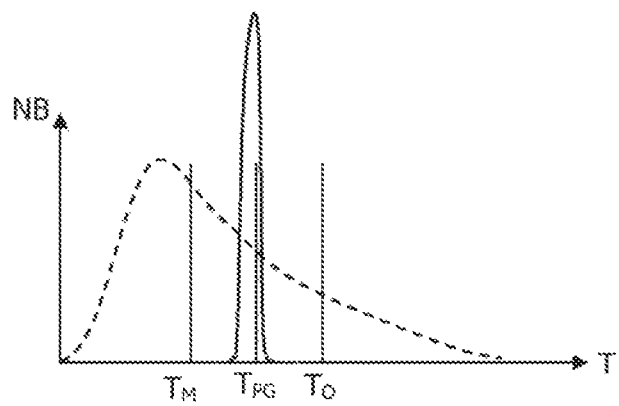
FIG. 3 shows a comparison of the distributions of key generation durations obtained with and without the invention.

FIG. 3 illustrates the effect of the invention. In dashed line is shown the repartition of the number NB of obtained prime numbers in relation with the necessitated time duration T. Such a repartition is spread around an average time $T_M$ of generation. In general, a critical time $T_O$ is the maximal admissible duration for a random number generation. It can be seen on FIG. 3 that some prime number generations are longer than this critical time $T_O$.

While choosing a predetermined amount of time $T_{PG}$ between the average time and the critical time, the prime number generation is regularly maintained.

With the invention the time generation for a prime number is centered on the predetermined time limit $T_{PG}$ as shown in plain line.

It is seen here that the invention enables to narrow the statistical distribution of the calculation duration around the predetermined amount of time $T_{PG}$ chosen to interrupt the prime number generation. If the predetermined amount of time is too close or below the average time $T_M$, the reserve of previously stored prime number will be too quickly consumed and there will be an important risk for the prime number generation duration to exceed the critical time $T_O$.

When $T_{PG}$ is chosen above the average time $T_M$ but below the critical time $T_O$, the quantity of prime number can be maintained and the duration of the prime number generation will be systematically below the critical time $T_O$.

In relation with awaited behaviors in specific cases/applications, strategic choice concerning the prime numbers and candidates provision can be elaborated.

Figure 4:
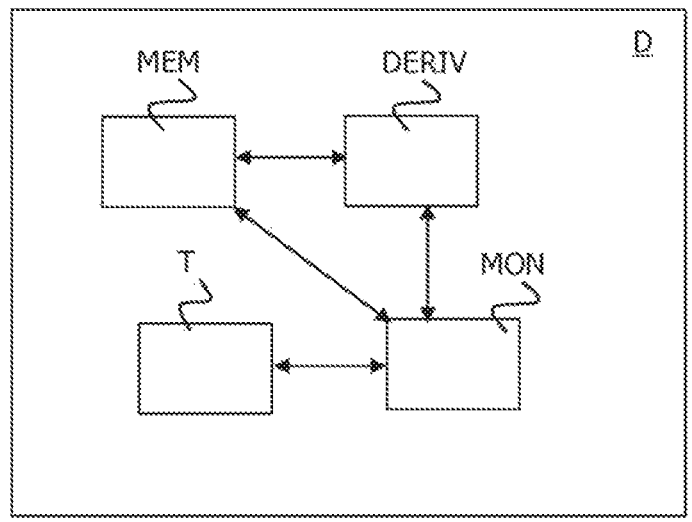
FIG. 4 schematically shows a device according to the invention.

FIG. 4 schematically shows a device D according to the invention. It comprises a calculation module DERIV to perform derivation calculators, a memory MEM to store candidates $p_s$ and generated prime numbers p. The prime number generation is monitored by a monitoring module MON which operates while using a timer T enabling to track the duration of the prime number generation according to the invention. It stops the derivation calculation as soon as the predetermined amount of time is reached, triggers the storage of intermediary results and extracts at least a prime number from memory to perform operations necessitated by the prime numbers requesting application.

The invention is advantageous as few production constraints are generated. Only a pre-provisioning of some prime numbers is necessitated. The invention is indeed technically easy to implement. Furthermore the invention is interoperable and compatible with existing APIs. If the pre-provisioning is sufficient and if the time parameters are well chosen, the generation on board of the device has no limitation in time.

Based on a better process time management on board, the invention does not require important cooperation from external parties contrarily to the prior art's solutions.

In the above detailed description, reference is made to the accompanying drawings that show, by way of illustration, specific embodiments in which the invention may be practiced. These embodiments are described in sufficient detail to enable those skilled in the art to practice the invention. It is to be understood that the location or arrangement of individual elements within each disclosed embodiment may be modified without departing from the spirit and scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method to generate prime number on board a portable computing device, said method comprising the steps of, each time at least one prime number is requested:
   store, by the portable computing device, a predefined number of pre-calculated prime numbers, said pre-calculated prime numbers being available to be output in case no other calculated prime number is available, wherein the predefined number of the pre-calculated prime numbers is determined depending on calculation resources of the portable computing device and generation duration constraints from an application requesting the generation;
   when available, retrieve, by the portable computing device, results from previously performed derivation calculation or, if not, select a start point for derivation;
   process, by the portable computing device, derivation calculation to converge towards a prime number;
   if a prime number is found, store, by the portable computing device, the prime number and restart derivation calculation from a new start point;
   stop, by the portable computing device, continuation of the derivation calculation after one or more iterations of the derivation calculation and after a predetermined amount of time;
   store, by the portable computing device, intermediate results to be used a next time a prime number will be requested; and
   output, by the portable computing device, a stored prime number different from the intermediate results.

2. Method according to claim 1, said method being further implemented during non critical phases of functioning of the portable computing device even in absence of any request for a prime number.

3. Method according to claim 1, further including using the prime numbers for the generation of cryptographic material.

4. Method according to claim 3, wherein, cryptographic material being an RSA key pair and the generation of two prime numbers being requested, the predetermined amount of time is determined based on a double prime number generation.

5. Device configured to produce cryptographic material based on at least one prime number, said device comprising:
   a timer;
   a memory storing a predefined number of pre-calculated prime numbers, said pre-calculated prime numbers being available to be output in case no other calculated prime number is available, wherein the predefined number of the pre-calculated prime numbers is determined depending on calculation resources of the device and generation duration constraints from an application requesting the generation; and
   computational hardware configured to cause the device to:
      when available, retrieve results from previously performed derivation calculation or, if not, select a start point for derivation;
      process derivation calculation to converge towards a prime number;
      if a prime number is found, store the prime number and restart derivation calculation from a new start point;
      stop continuation of the derivation calculation after one or more iterations of the derivation calculation and after a predetermined amount of time;
      store intermediate results to be used a next time a prime number will be requested; and
      output a stored prime number different from the intermediate results.

6. Device according to claim 5, said device belonging to the group constituted by smart cards, HSM, tokens, USB keys, and embedded secure elements.

* * * * *